May 22, 1934.  T. GLEN, JR  1,960,052
ADJUSTABLE HOLDER FOR POT LIDS
Filed Nov. 25, 1930
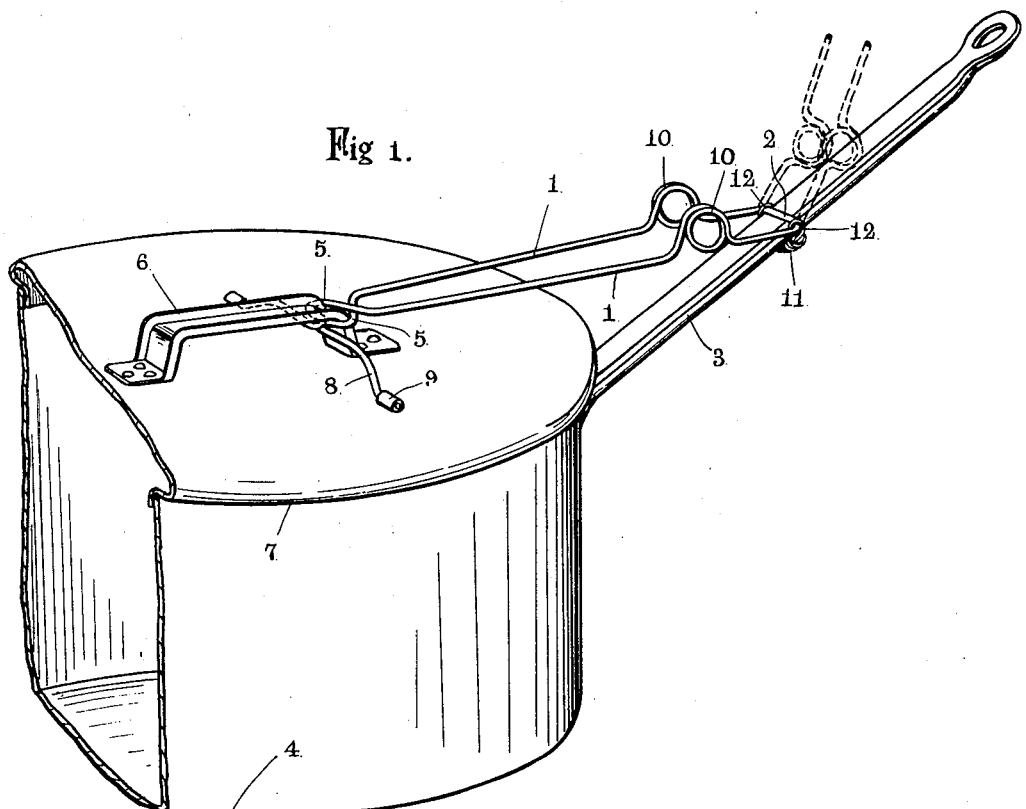
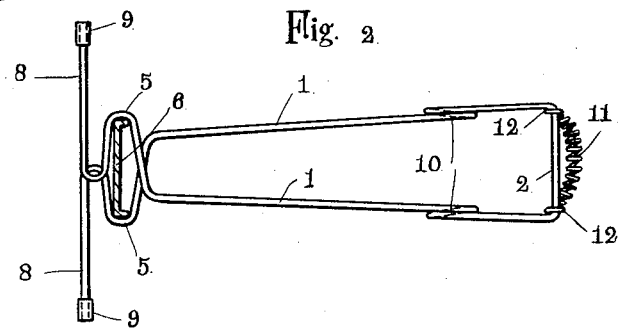
INVENTOR,
Thomas Glen Jun<sup>r</sup>
By his Attorney,
WITNESSES.

Patented May 22, 1934

1,960,052

UNITED STATES PATENT OFFICE 1,960,052

ADJUSTABLE HOLDER FOR POT LIDS

Thomas Glen, Jr., Coogee, Australia

Application November 25, 1930, Serial No. 498,084
In Australia September 16, 1930

3 Claims. (Cl. 53—8)

The object of my invention is to connect a pot lid to the pot by readily adjustable and detachable means which permit the lid to be turned back upon the handle to afford access to the interior of the pot, and by which the lid may be held upon the pot during the operations of straining and the like.

The essential features of my invention comprise a clasp adjustable upon the pot handle, a clasp for the knob or handle of the pot lid and medium connecting the two clasps hinged upon the clasp of the pot handle.

Preferably the handle or knob of the lid is clasped between a pair of grip members which are connected to the pot handle by hinge means adjustable upon the handle in such manner as to be readily positioned to suit the size of the pot.

The clasps of the lid and of the pot handle are also adapted to be expeditiously attached and removed.

Means by which my invention may be carried into practical effect are illustrated in the accompanying drawing wherein:—

Fig. 1 is a perspective view and
Fig. 2 a plan.

A single piece of wire is bent to provide a pair of arms 1—1 connected by a bridge 2 which rests upon the top of the handle 3 of the pot 4.

Near the outer ends of the arms are the reverse bends 5—5 which clasp between them the handle 6 of the pot lid 7 the arms crossing one the other thereby forming a spring clasp.

The ends of the wire are bent approximately at right angles to provide lateral arms 8—8 which bear upon the top of the lid and prevent it from side tilting.

A short length of tubular rubber 9 is sleeved upon the end of each of the lateral arms to prevent marking the lid by the wire.

In each of the arms 1—1 is a loop 10—10 which may be used as a finger loop when raising the lid from the pot or in keeping it upon the pot during straining and similar operations.

The loops also rest upon the pot handle (as shown in dotted lines Fig. 1) when the lid is turned back.

A spring loop 11 of coiled wire has eyes 12—12 at its extremities which respectively encircle the arms 1—1 near their juncture with the bridge.

In placing the device in position the bows are spread apart by pressing together the arms 1—1 and the handle or knob of the lid is clasped between them.

The handle of the pot is then inserted between bridge 2 and spring loop 11 and the bridge and loop slid along the handle to the position necessary to enable the flange of the pot lid to pass into the top of the pot.

I claim:—

1. A pot lid holder comprised of a pair of arms, an integral bridge between the arms at one end thereof, a spring clasp, at the opposite end from the bridge, formed by crossing the arms and bending each into a bow, a lateral extension from each arm adapted to rest upon the pot lid, a finger loop integral with each arm, and hinging means, of which said bridge forms a part, for connecting the arms to a pot handle.

2. In a pot lid holder, a pair of arms, a bridge connecting the arms at one end, a spring clasp at the opposite end from the bridge formed by crossing the arms and bending each of them into a bow, a lateral extension from the end of each arm adapted to rest upon the pot lid, and a spring loop of coiled wire the ends whereof are connected to the arms near said bridge.

3. In a pot lid holder a pair of arms, a bridge connecting the arms at one end, a spring clasp at the opposite end from the bridge, formed by crossing the arms and bending each of them into a bow, and finger loops one in each arm adapted, when the handle of the pot lid has been engaged by said clasp and the arms turned back, to rest upon the pot handle.

THOMAS GLEN, JR.